K. L. CURTIS.
TROLLEY WIRE HANGER.
APPLICATION FILED MAY 16, 1911.
1,032,468.
Patented July 16, 1912.
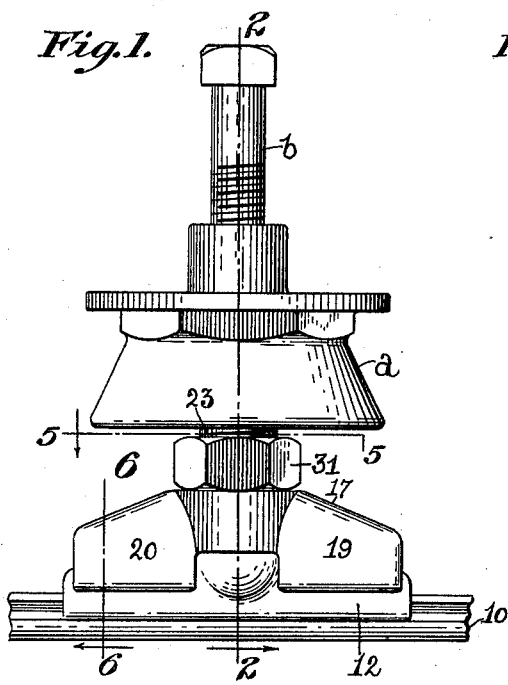
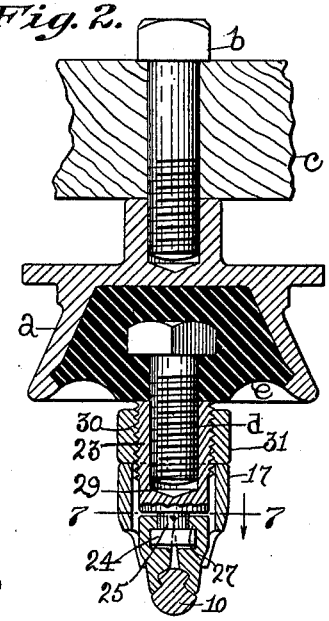
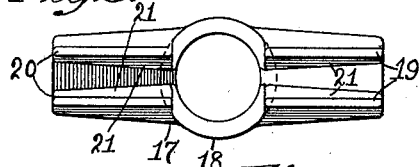
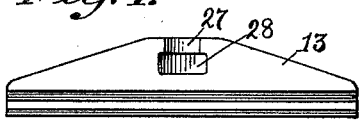
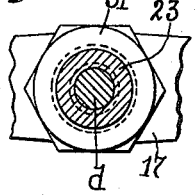
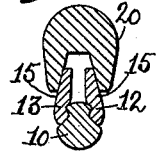
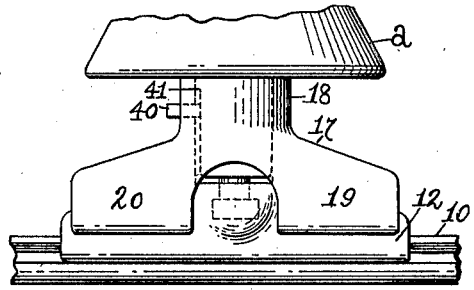
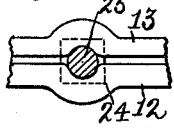
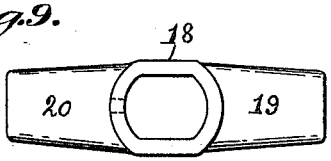
WITNESSES:
M. G. Crozier
J. Murphy
INVENTOR.
Kenneth L. Curtis
BY Jas. H. Churchill
ATTORNEY.

UNITED STATES PATENT OFFICE.

KENNETH L. CURTIS, OF BOSTON, MASSACHUSETTS, ASSIGNOR TO ALBERT AND J. M. ANDERSON MANUFACTURING COMPANY, OF BOSTON, MASSACHUSETTS, A CORPORATION OF MAINE.

TROLLEY-WIRE HANGER.

1,032,468.

Specification of Letters Patent. Patented July 16, 1912.

Application filed May 16, 1911. Serial No. 627,572.

*To all whom it may concern:*

Be it known that I, KENNETH L. CURTIS, a citizen of the United States, residing in Boston, county of Suffolk, and State of Massachusetts, have invented an Improvement in Trolley-Wire Hangers, of which the following description, in connection with the accompanying drawings, is a specification, like letters on the drawings representing like parts.

This invention relates to a hanger or supporting device for trolley wires and more particularly to the clamping mechanism by which the trolley wire is firmly secured to said hanger.

The present invention has for its object to provide a simple, inexpensive and efficient clamping mechanism with which the trolley wire and especially the 8-shaped trolley wire may be firmly secured in position in a minimum time and with minimum labor.

The particular features of this invention will be pointed out in the claims at the end of this specification.

Figure 1 is a side elevation of one form of hanger provided with a clamping mechanism embodying this invention. Fig. 2, a vertical section on the line 2—2, Fig. 1. Fig. 3, a plan view of the wedge member inverted. Fig. 4, an inner side view of one of the clamping jaws. Fig. 5, a detail in section on the line 5—5, Fig. 1. Fig. 6, a section on the line 6—6, Fig. 1. Fig. 7, a detail in section on the line 7—7, Fig. 2. Fig. 8, a modification to be referred to, and Fig. 9, a plan of the wedge member employed in the construction shown in Fig. 8.

Referring to the drawings, *a* represents the hanger proper, which may be of any suitable, usual or desired construction, and which in the present instance is secured by a bolt *b* to a support *c*, and is provided with a bolt *d* having its head embedded in insulation *e*, and its threaded shank extended below said insulation.

The bolt *d* has secured to it the clamping mechanism for the trolley wire 10, which is 8-shaped in cross-section.

The clamping mechanism referred to, comprises clamping members or jaws 12, 13, suitably shaped at their lower portion to engage the upper part of the trolley wire 10, and provided with tapering or inclined outer surfaces 15, (see Fig. 6), which converge upwardly and coöperate with a compressing member 17 of substantially the length of said jaws and having a substantially central hollow boss 18 and two sets of arms 19, 20, on opposite sides of the hollow boss, said arms having upwardly converging inner surfaces 21, which are designed to engage the tapering outer surfaces of the jaws 12, 13.

The arms 19, 20 of the compressing member straddle the jaws 12, 13, and are made of sufficient depth to enable them to engage the said jaws in close proximity to the trolley wire 10 and for substantially the length of said jaws, whereby a firm and substantial grip of the jaws on the wire is obtained.

The hollow boss 18 of the compressing member has extended into it a holding member for the clamping jaws, said holding member comprising a body portion 23 and an angular head 24 connected to the lower end of the body portion by a neck 25, which leaves an annular groove between the said head and body portion, into which extends flanges or lips 27 formed on the inner surfaces of the clamping jaws by angular recesses 28 in said inner surfaces.

The recesses 28 are designed to receive the angular head 24 (see Figs. 2 and 7), and the lips 27 are designed to extend over the head 24. The body portion 23 of the holding member is provided with a screw threaded socket 29, which engages the screw-threaded bolt *d* so as to secure the clamping mechanism to the insulator.

In the construction shown in Figs. 1 and 2, the holding member 23 is extended through and above the compressing member, and has its upper end provided with screw-threads 30 on its exterior surface for engagement with a nut 31, interposed between the compressing member and the insulator, and by turning which in one direction, the compressing member is forced downwardly so as to cause the tapered inner surfaces of the arms 19, 20 of the compressing member, to engage the tapered external surfaces of the clamping jaws and force them into firm engagement with the trolley wire. By turning the nut 31 in the opposite direction, the clamping jaws are rendered loose with respect to the trolley wire. When the nut 31 is turned, the holding member is held from turning by its angular head 24 engaging the recesses 28 in the clamping jaws, and the latter are prevented from turning by the wire. By means of the nut 31 turning on the holding member to move the compressing member bodily toward the clamping jaws, the clamping mechanism can be applied to insulated hangers, which are stationary, that is, the insulator can be secured in fixed relation to its support, and after it has been placed in position, the trolley wire may be clamped thereto by turning the nut as above described.

In cases where the insulated hanger has not been secured to its support, but is free to be turned, the construction of clamping mechanism shown in Figs. 1 and 2 may be employed, or the construction shown in Figs. 8 and 9 may be employed.

The construction shown in Figs. 8 and 9 is substantially the same as in Figs. 1 and 2, except that the nut 31 is dispensed with, and the hollow boss 18 of the compressing member is made long enough to engage the insulator and be forced downwardly so as to cause the clamping jaws to grip the wire, by turning the insulator.

In the construction shown in Figs. 8 and 9, the hollow boss 18 of the compressing member is made other than circular in form, and the holding member is provided with a correspondingly-shaped exterior surface. In the construction shown in Figs. 8 and 9, the holding member and the compressing member are connected together so as to be handled as one piece and yet allow a limited movement of the holding member and its clamping jaws with relation to the compressing member, so as to enable said jaws to be applied to the wire, by a pin 40 inserted through a hole in the compressing member and engaging a lip 41 at the upper end of the holding member. In the construction shown in Figs. 1 and 2, the nut 31 performs the same office as the pin and lip.

In operation with the construction shown in Figs. 1 and 2, the clamping jaws are applied to the head of the holding member, and the latter is extended up through the hollow boss of the compressing member, and the nut 31 is then applied to the projecting end of the holding member and turned down so as to cause the arms of the compressing member to approach the clamping jaws sufficiently to prevent the latter being disengaged from the head of the holding member, after which the whole device is turned to screw the holding member on the bolt $d$ and against the bottom of the insulator. The compressing member is then lifted to permit the clamping jaws to separate sufficiently to be applied to the wire, and when thus applied, the nut 31 is turned to move the compressing member into contact with the clamping jaws and force them into firm engagement with the wire.

In operation with the construction shown in Fig. 8, the holding member with the clamping jaws fitted thereon is inserted up into the hollow boss of the compressing member, and the pin 40 is then inserted to project into the said boss and engage the lip 41, thereby connecting the parts together so that they can be handled as one piece. The threaded bolt $d$ of the insulator is then inserted in the socket in the holding member, and the insulator is turned to move the compressing member down on the clamping jaws and force them into firm engagement with the wire. The clamping mechanism is herein shown as embodied in one form of insulated hanger, but it is not desired to limit the invention to the particular form herein shown.

Claims.

1. The combination with a hanger of the character described provided with a threaded bolt, of a clamping mechanism comprising clamping jaws capable of engaging the trolley wire and provided with tapering outer surfaces and on their inner surfaces with lips and recesses below said lips, a compressing member fitted over the clamping jaws and having inclined inner surfaces coöperating with the inclined outer surfaces of said jaws in proximity to the lower ends of said jaws to cause the latter to firmly grip the trolley wire, a holding member within the compressing member having a head at its lower end to extend into the said recesses and to engage said lips, and provided with a threaded socket for the reception of said threaded bolt, and a nut in threaded engagement with the external surface of the upper part of the holding member and coöperating with the compressing member to bodily move the latter toward the clamping jaws to force the said jaws into engagement with the trolley wire.

2. The combination with a hanger of the character described provided with a threaded bolt, of a clamping mechanism comprising clamping jaws capable of engaging the trolley wire and provided with tapering outer surfaces and on their inner surfaces with lips and recesses below said lips, a compressing member fitted over the clamping jaws and having inclined inner surfaces coöperating with the inclined outer surfaces of said jaws in proximity to the lower ends of said jaws to cause the latter to firmly grip the trolley wire, a holding member within the compressing member having a head at its lower end to extend into the said recesses and to engage said lips, and provided with a threaded socket for the reception of said threaded bolt, said clamping jaws being caused to engage the wire by movement of the compressing member toward the clamping jaws.

3. The combination with a hanger of the character described provided with a threaded bolt, of a clamping mechanism comprising clamping jaws capable of engaging the trolley wire, a compressing member provided with arms to engage said clamping jaws and with a hollow boss between the ends of said arms, and a holding member for said clamping jaws within the hollow boss of said compressing member and coöperating with said bolt, substantially as described.

4. The combination with a hanger of the character described provided with a threaded bolt, of a clamping mechanism comprising clamping jaws capable of engaging the trolley wire, a compressing member provided with arms to engage said clamping jaws and with a hollow boss between the ends of said arms, and a holding member for said clamping jaws within the hollow boss of said compressing member and coöperating with said bolt, and means to bodily move the compressing member toward the clamping jaws and cause them to grip the wire, substantially as described.

5. The combination with a hanger of the character described, of a clamping mechanism comprising clamping jaws capable of engaging the trolley wire, a compressing member comprising a hollow boss and arms extended from opposite sides thereof and straddling the clamping jaws, said arms being extended substantially the length of said jaws and coöperating therewith to force the same into engagement with the trolley wire, means to bodily move said compressing member toward said clamping jaws, and means to connect said clamping mechanism with said hanger, substantially as described.

6. A clamping mechanism of the character described, comprising clamping jaws disconnected from each other, a compressing member comprising a hollow boss and arms on opposite sides thereof which straddle the said clamping jaws, said arms having their inner surfaces coöperating with the outer surfaces of the clamping jaws to effect movement of the jaws toward each other, one of said parts being bodily movable toward the other, and means for bodily moving one of said parts toward the other, substantially as described.

7. The combination with a hanger of the character described, of clamping jaws to engage the trolley wire, a device depending from said hanger and having a head for engagement with the inner surfaces of said jaws, a compressing member provided with arms extended in the direction of the length of the clamping jaws to straddle the same and having an opening of greater diameter than said device and head to enable the compressing member to be slipped up over the headed end of the device, and a nut interposed between said compressing member and hanger, substantially as described.

In testimony whereof, I have signed my name to this specification in the presence of two subscribing witnesses.

KENNETH L. CURTIS.

Witnesses:
JAS. H. CHURCHILL,
J. MURPHY.

---

Copies of this patent may be obtained for five cents each, by addressing the "Commissioner of Patents, Washington, D. C."